United States Patent [19]

Richards et al.

[11] 4,303,524

[45] Dec. 1, 1981

[54] ROTARY VACUUM PRECOAT FILTER

[76] Inventors: Thomas E. Richards, Rte. 1, Box 16, Jennings, Fla. 32053; James P. Harvey, 9Hillside Dr.; Michael A. Daigle, Rte. 10, Box 266A, both of Lake City, Fla. 32055

[21] Appl. No.: 153,880

[22] Filed: May 28, 1980

[51] Int. Cl.³ .............................................. B01D 33/06
[52] U.S. Cl. ..................................... 210/406; 210/408; 210/149
[58] Field of Search .............. 210/402, 406, 408, 407, 210/186, 193, 777, 778, 96.1, 742, 149

[56] References Cited

U.S. PATENT DOCUMENTS

| 2,839,194 | 6/1958 | Lopker et al. | 210/402 |
| 2,937,069 | 5/1960 | Zoellner | 423/320 |
| 3,425,799 | 2/1969 | Hazen et al. | 423/320 |
| 3,468,423 | 9/1969 | Pechon | 210/402 |
| 3,715,191 | 2/1973 | Rushton et al. | 423/320 |
| 3,919,088 | 11/1975 | Doncer et al. | 210/402 |
| 4,110,422 | 8/1978 | Kell | 423/317 |
| 4,115,265 | 9/1978 | Otte et al. | 210/402 |
| 4,121,968 | 10/1978 | Wells | 210/402 |
| 4,136,199 | 1/1979 | Nells | 423/321 R |

Primary Examiner—Benoît Castel

[57] ABSTRACT

An improved rotary vacuum precoat filter apparatus comprises a nozzle positioned for spraying a displacing liquid on the outer surface of the filter cake. Connected to the nozzle is a supply conduit for delivering the displacing liquid under pressure to the nozzle. Included along the supply conduit is a temperature control for regulating the temperature of the displacing liquid. The temperature of the displacing liquid is regulated for providing a spray of the displacing liquid about the temperature of the filter cake. Such temperature regulation minimizes thermal shock to the precoat of filter aid forming the filter cake.

10 Claims, 2 Drawing Figures

ROTARY VACUUM PRECOAT FILTER

BACKGROUND OF THE INVENTION

The present invention is directed to an improvement in a rotary vacuum precoat filter. More particularly, the invention is directed to an improvement in a rotary vacuum precoat filter for use in filtering hot, unsaturated, saturated or supersaturated slurry. In a more particular sense, the improved rotary vacuum precoat filter herein has utility for use in filtering a phosphoric acid slurry formed during the manufacture of phosphoric acid.

Phosphate rock is mined principally for conversion to phosphoric acid and thereafter to high phosphate fertilizer products. Mined phosphate rock usually after beneficiation, is solubilized with phosphoric acid and reacted with sulfuric acid to produce phosphoric acid solution and insoluble calcium sulfate. Such a process is generally referred to in the industry as the wet process of phosphoric acid production. The resultant phosphoric acid solution is further processed to produce fertilizer products.

The oldest and most economical method for making crude phosphoric acid is to dissolve beneficiated phosphate rock in phosphoric acid which usually contains some sulfate ions and then to complete precipitation of calcium by adding sulfuric acid, thereby precipitating calcium sulfate and releasing phosphoric acid (wet process).

In the evolution of phosphoric acid production, the processes for making phosphoric acid have been named in relation to the by-product produced during the process. For example, the phosphoric acid production processes are known as the gypsum process (more commonly the dihydrate process), the hemihydrate process and the anhydrite process. All three processes are named with regard to the by-product calcium sulfate produced. The gypsum or dihydrate process is conducted at a temperature of 90° C. or less and a $P_2O_5$ concentration of about 30% in the liquid portion of the slurry. Increasing the temperature from about 90° to 120° C. and the $P_2O_5$ concentration from about 30% to about 45% in the liquid phase produces calcium sulfate hemihydrate. If, however, one chooses to run the phosphoric acid wet process at 130° C. and a $P_2O_5$ concentration greater than 30%, then one obtains calcium sulfate anhydrite as the by-product. For further detail on the preferred conditions for each type process see U.S. Pat. No. 4,196,172 of Oré et al issued Apr. 1, 1980, incorporated herein by this reference. The processes are more fully described in "Phosphoric Acid," Parts I and II, edited by A. V. Slack, Marcel Dekker, Inc., New York, N.Y., 1968.

Generally, in a hemihydrate process, phosphate rock and sulfuric acid are reacted with a slurry comprising phosphoric acid, sulfuric acid, monocalcium phosphate and calcium sulfate hemihydrate. The phosphoric acid in the slurry can be a recycled process phosphoric acid or a recycling of the slurry. The temperatures and $P_2O_5$ concentrations are such that the main product from the reaction of phosphate rock and the sulfuric acid is calcium sulfate hemihydrate and phosphoric acid. Little, if any, calcium sulfate dihydrate is observed in the reaction. The slurry so produced is then sent to a recovery section where the solids are separated from the liquid. The bulk of the solids to be separated comprises the by-product calcium sulfate and for this process calcium sulfate hemihydrate. Repulping of the calcium sulfate hemihydrate in water and sulfuric acid and recrystallization to gypsum can be useful in increasing phosphoric acid yield.

Separation of the calcium sulfate hemihydrate, or gypsum from repulping, and other solids from the slurry is usually accomplished by means of a filter or less preferably by a centrifuge. Many filters are available for separating the solids from the slurry. The rate of filtration or the filterability of the slurry is dependent, among other things, upon the size, shape (or crystal habit) and size distribution of the calcium sulfate hemihydrate crystals produced during the reaction.

The crude phosphoric acid recovered after filtration of the calcium sulfate by-product assays from 22 to 45 percent $P_2O_5$ and is subsequently concentrated by evaporation to a $P_2O_5$ assay of about 50%. The concentrated crude phosphoric acid can be utilized in the production of fertilizers or can be treated to produce high grade phosphoric acid or other phosphates.

The crude phosphoric acid includes substantial proportions of impurities, such as fluorine; calcium, determined as CaO; sodium, expressed analytically as $Na_2O$; $SiO_2$; $SO_4$; iron, determined as $Fe_2O_3$; aluminum, determined as $Al_2O_3$; and magnesium determined as MgO. The relative proportions of impurities contained in the crude phosphoric acid are largely determined by the type of wet processing utilized to produce the crude phosphoric acid and the nature of the phosphate-bearing rock from which the crude phosphoric acid is produced. Sufficient proportions of the impurities remain in the acid even after aging and settling and after a substantial period of time, separate from the acid in the form of a sludge. It is commercially impractical to hold the crude phosphoric acid sufficiently long enough to allow the formation and separation of the sludge and consequently the sludge is normally encountered at the user's location, often resulting in rejection of the acid.

It has been found, as disclosed in U.S. Pat. No. 4,235,854, filed of Smith et al, that by preheating the acid, followed by vacuum filtration through a filter medium including a diatomite cake, sludge forming impurities can be removed in sufficient quantity to substantially eliminate the subsequent formation of sludge during shipping and handling of the phosphoric acid product. The above U.S. Pat. No. 4,235,854 is assigned to the same assignee (or parent corporation of the present assignee) and the entire disclosure thereof is incorporated herein by this reference.

Sludge forming impurities can be removed from phosphoric acid by the process disclosed in U.S. Pat. No. 4,136,199, the entire disclosure of which is incorporated herein by this reference.

Preferably, the filtration of the crude phosphoric acid is conducted using a rotary vacuum precoat filter. Rotary vacuum precoat filters are well-known in the art. Such rotary vacuum precoat filters which typically comprise rotating a cylindrical filter drum to continuously submerge a segment or portion of the peripheral screen filtering medium consisting essentially of a permeable bed or cake of filter aid, into the suspension or slurry of liquids and solids to be filtered, the pressure differential inducing passage of the liquid filtrate component of the suspension or slurry through the filtering medium, thereby separating the liquid from the solids, which are retained on the surface or entrapped within the interstices of the present cake adjacent to the surface. Collection and retention of the solids fill and can block the pores or interstices, inhibiting further passage and separation of filtrate which necessitates the removal of the surface portion of the precoat cake containing the retained and entrapped solids to permit further filtration.

In many vacuum precoat filters, the removal of retained solids is typically effected by means of a continuously advancing doctor knife or blade which penetrates into the precoat cake to a depth approximately that reached by the entrapped solids. Thus, uninterrupted filtration through rotation of the cylindrical filter drum is permitted by the continuous cutting away and removing of the precoat cake and entrapped solids and in turn exposing a substantially uncontaminated new surface of precoat cake for further filtration.

Once the progressively advancing knife reduces the precoat cake to the minimum thickness necessary for satisfactory filtration, the filtering cycle is halted while a new or additional precoat is applied.

With the use of rotary vacuum precoat filters, as well as other types of precoat filters, some $P_2O_5$ values can be lost in the precoating of filter aid. That is, the precoat cake can entrap and retain $P_2O_5$ values in the intersices of the cake. It would be desirable to develop apparatus and a method for recovering such $P_2O_5$ values.

SUMMARY OF THE INVENTION

The apparatus herein provides an improvement in a rotary vacuum precoat filter assembly having utility for producing a filtered liquid from an incoming feed stream of a solids-containing slurry. The rotary vacuum precoat filter comprises a rotatable filter drum, a precoat of filter aid forming a filter cake on an outer surface of the drum and means for creating and maintaining a pressure differential across the filter cake of filter aid sufficient for drawing filtrate into the drum when the solids-containing slurry is applied to an outer surface of the filter cake.

The improvement in the apparatus comprises a nozzle positioned for spraying a displacing liquid on the outer surface of the filter cake. Connected to the nozzle is a supply conduit for delivering the displacing liquid under pressure to the nozzle. Included along the supply conduit is a temperature control for regulating the temperature of the displacing liquid. The temperature of the displacing liquid is regulated for providing a spray of the displacing liquid about the temperature of the filter cake. Such temperature regulation minimizes thermal shock to the precoat of filter aid forming the filter cake. Thermal shock of the filter cake is undesirable as it can decrease filtration efficiency and lead to cracking or channeling of the filter cake. The displacement liquid is sprayed from the nozzles and impinges on the filter cake. The displacement liquid which impinges upon the filter cake displaces additional filtrate entrapped in and retained by the filter cake.

Thermal shock is especially undesirable when it causes cake shrinkage. Accordingly, the displacing liquid can sometimes be regulated at a higher temperature than the filter cake but usually should not be regulated at a temperature substantially lower than that of the filter cake.

BRIEF DESCRIPTION OF THE DRAWINGS

The invention herein will be better understood with regard to the following detailed description and accompanying drawings wherein.

DETAILED DESCRIPTION

The improved rotary vacuum precoat filter assembly is herein described with regard to the accompanying drawings. Although the rotary vacuum precoat filter herein can have utility in other processes, for ease of describing and understanding its operation it will be described herein with regard to the separation of solids from a crude phosphoric acid stream.

Figure 1:
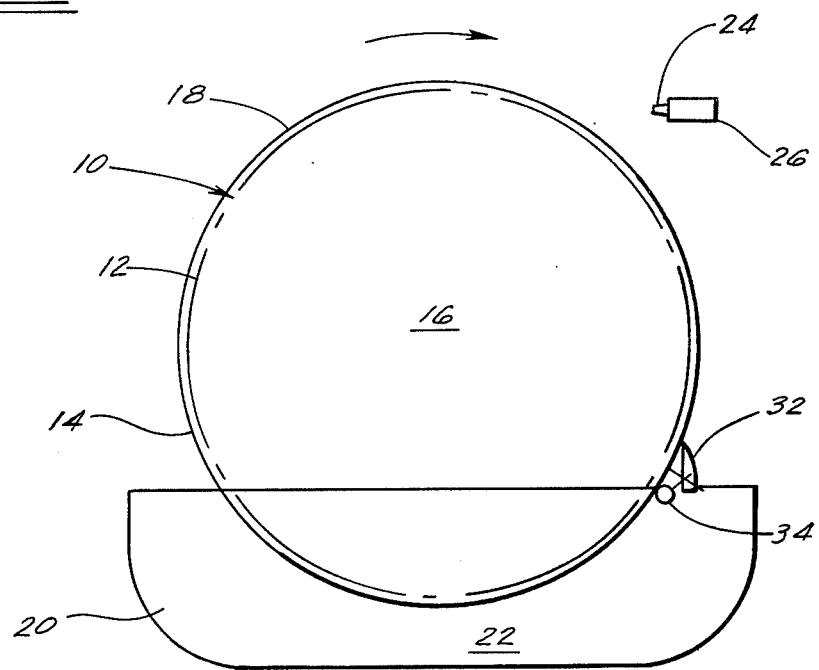
FIG. 1 is a plan view of an embodiment of the improved apparatus herein.
Figure 2:
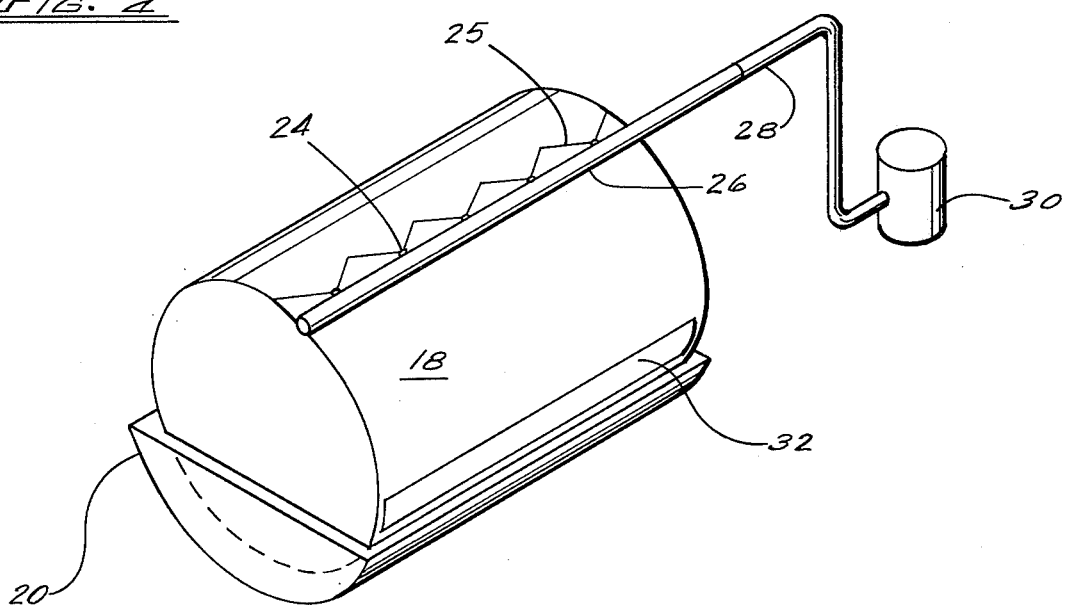
FIG. 2 is a perspective view of the embodiment of FIG. 1.

With reference to the drawings, the improved rotary vacuum precoat filter 10 essentially comprises a cylindrical filter drum 12 supported in a filter tank 20 in a manner as to allow rotation of the drum about its own rotational axis which is essentially in a horizontal plane. The ends of the drum are either open spiders or closed heads which carry the two main trunions which support the drum. The drum 12 has an outer surface 14 which is grid-like for permitting the flow of fluid therethrough. Within the drum is at least one compartment or cavity 16. Such a cavity 16 receives the liquid filtrate and contains elements for conveying such liquid filtrate out of the drum. In FIG. 1 the curved arrow shows the (clockwise) direction of rotation.

The outer surface 14 of the drum is covered with a filter cloth for preventing or at least inhibiting the passage of solids and filter aid through the outer surface and into the drum. Over the filter cloth is formed a filter cake 18. The filter cake is formed of a suitable filter aid such as diatomaceous earth, perlite, celluosic pulp, etc. The filter cake is built-up around the drum to a suitable depth for filtering the particular slurry being filtered. Generally, the filter cake is formed to a depth on the outer surface of the drum from about ½ inch to about 4 inches. The filter cake is built-up on the drum by introducing a slurry of the filter aid to the filter tank 20. A reduced pressure is then created in the cavity 16 which draws the filter aid to the outer surface of the drum. The process is continued as the drum revolves about its axis to increase the depth of the filter aid coating.

The filter tank 20 is positioned below and around the drum. The position of the drum in the tank is such that a lower portion of the drum is confined within the tank while an upper portion of the drum is exposed above the tank. The filter tank 20 serves as the reservoir which contains the slurry 22 to be filtered by the vacuum rotary precoat filter. Such a slurry is fed to the filter tank and from the tank is absorbed onto and through the filter cake.

Positioned above the drum is a nozzle 24 or plurality of nozzles 24. Preferably a plurality of nozzles is provided to provide a spray pattern which covers the length of the drum. The nozzles 24 provide a spray of displacing fluid on the filter cake on the outer surface of the drum. When a plurality of nozzles are provided, the nozzles each provide a spray pattern 25 of the displacing liquid which meets each adjacent spray pattern as the spray impinges the filter cake. The spray patterns can overlap to a small extent but it is preferred that the spray patterns at least meet. If the spray patterns do not meet, then a portion of the filter cake may not be wetted with the displacing liquid. Preferably, the nozzles 24 provide a spray pattern that is essentially fan-shaped rather than conical. Such a fan-shaped spray pattern 25 provides an essentially even coating of the displacing liquid along a line of impingement on the filter cake. Acceptable nozzles are available commercially such as the type H-U and type U series nozzles commercially available from Spraying Systems Co., of Wheaton, Ill.

The nozzles are positioned such that the direction of spray is opposite the direction of revolving of the drum. In addition, the direction of spray is along the surface of the filter cake, that is essentially tangential to the filter cake, rather than directed toward the filter cake. If the direction of spray were toward the filter cake, the pressure of the spray could force small particles of sludge deep into the precoat and cause reduced filter rate. The spray could also disrupt the surface of the filter cake and possibly cause channeling if the spray were directed toward the filter cake.

The nozzles are supported on at least one header 26 which maintains the nozzles spaced from the drum and filter cake. The header 26 comprises a conduit for delivering displacement liquid to the nozzles. The header 26 can extend along the length of the drum when a plurality of nozzles are used. The header has a sufficient diameter for maintaining an essentially even pressure of displacing liquid feed for each of the nozzles to maintain substantially even and uniform spray patterns.

Connected to the header is a feed conduit 28 which supplies a feed of the displacing liquid to the header and nozzles. Along the feed conduit 28 is a temperature regulator 30 which can monitor and adjust the temperature of the displacing liquid. That is, the temperature regulator can raise or lower the temperature of the displacing liquid to avoid or inhibit thermal shock to the filter cake as the displacing liquid is sprayed onto the filter cake. The temperature regulator can be a heated reservoir or a steam sparge tank when it is desirable to raise the temperature of the displacing liquid.

Positioned along the surface of the drum is a knife 32 which provides a knife-edge or scraper for removing an outer portion of the filter cake as the drum revolves past the knife. The position of the knife is adjustable by the knife-adjuster 34. The knife can be adjusted to continuously remove an outer portion of the filter cake. That is, the depth of the filter cake can be decreased continually, such as from 4 inches to $\frac{1}{2}$ inch in increments as the drum revolves. By removing an outer portion of the filter cake a fresh surface of the filter cake is provided for receiving the slurry to be filtered.

The apparatus herein was utility for filtering essentially any slurry wherein solids are suspended in liquid to separate the liquid from the solids. The apparatus is especially utile in the recovery of phosphoric acid from a crude phosphoric acid stream. In such a process, the phosphoric acid produced by the reaction of phosphate rock, sulfuric acid, phosphoric acid (including recycle phosphoric acid) and calcium sulfate is a slurry. Such a slurry is generally filtered after it is removed from the reaction vessel to separate a crude phosphoric acid liquid stream from solids which essentially comprise calcium sulfate. The crude phosphoric acid is transferred to an aging tank or settling tank wherein some solids that remain in the crude phosphoric acid can settle and be removed.

As discussed above, such settling does not provide a commercially acceptable method of removal of undesirable fine solids (especially when low magnesium content acid is required). It has been found, especially with acid which has been treated with a calcium and fluoride containing solid as in U.S. Pat. No. 4,136,199, that a filtration of the crude phosphoric acid can remove impurities, in the form of solids present, to a commercially acceptable level.

In the filtration process, the crude phosphoric acid is heated to a temperature (if not already at such temperature) suitable for filtration. For phosphoric acid analyzing in the range of about 38 to about 58% $P_2O_5$, such a temperature is preferably between about 50° C. to about 77° C. for greatest separation of solids and recovery of $P_2O_5$ values from diatomaceous earth. Higher temperatures can be used with Perlite. Lower temperatures can be used for lower $P_2O_5$ analysis acids (e.g. about 26% $P_2O_5$ be filtered at acceptable rates at temperatures as low as about 100° F., typically at about 120° F. or higher). The crude phosphoric acid is preferably filtered through a vacuum rotary precoat filter.

The vacuum rotary precoat filter is prepared for filtering the crude phosphoric acid by precoating the drum of the filter with a filter cake comprising a filter aid, such as diatomaceous earth, perlite and the like. The filter aid precoat is applied to the rotating drum by introducing a slurry of the filter aid in filtered phosphoric acid (e.g. about 10 wt. % of diatomaceous earth) to the filter tank or bowl. As the drum revolves and a vacuum or reduced pressure is applied, the filter aid coats the outer surface of the drum. The filter aid is coated on the drum to a depth of about 2 to about 4 inches.

After the drum has been precoated, the crude phosphoric acid from the aging or settling tanks is introduced to the filter tank. A reduced pressure is created and maintained with the drum 12 by means of a suitable vacuum pump. A pressure differential is thereby effectuated across the filter cake. This pressure differential causes a pick-up of the crude phosphoric acid onto the filter cake. For better utilization of filter aid, when the inventory in the bowl is about enough to complete the precoat, the feed of precoat slurry to the bowl can be stopped and the precoat filtrate (filtered Phosphoric Acid) recycled to deplete the filter aid.

The phosphoric acid present in the crude phosphoric acid is pulled through the filter cake into the interior cavity 16 of the drum as the filtrate. A substantial quantity of the impurities present in the crude phosphoric acid as solids is retained in the filter cake. For example, the impurities retained can include fluorine; calcium, analytically expressed as CaO; sodium, analytically expressed as $Na_2O$; $SiO_2$; $SO_4^{-2}$; iron, analytically expressed as $Fe_2O_3$; aluminum, analytically expressed as $Al_2O_3$; magnesium, analytically expressed as MgO, heavy metals, etc.

In general, for faster filtration rates, the acid should be filtered at the highest temperature attainable, but not so as to produce appreciable attack of the filter aid.

In addition to retaining such impurities, there can be some $P_2O_5$ values entrapped within the interstices of the filter cake. Such entrapped $P_2O_5$ values have heretofore been lost in the filter cake as the filter cake is removed in increments by the advancing knife 32 or doctor blade. The knife is mounted on the apparatus for advancement in response to the rotation of the drum. As the drum rotates the knife advances toward the drum for controllably removing a portion of the filter cake. $P_2O_5$ values entrapped in the filter cake are removed along with the portion of the filter cake.

Some, usually a majority, of the $P_2O_5$ values entrapped in the filter cake can be recovered by spraying a displacing liquid onto the filter cake 18 prior to removal of an outer portion of the filter cake by the knife 32. The displacing liquid can be water, or dilute acid (e.g. "pond water") and is sprayed onto the filter cake from the sprayers 24. The sprayers 24 are preferably arranged and positioned to provide a spray pattern 25 that is essentially tangential to the filter cake. Such an angle provides less force on the filter aid comprising the filter cake than if the sprayers were directed toward the filter cake, thus does not force fine solids through the filter cake and into the clarified acid product. The angle of spray can be adjusted by appropriate movement of the nozzles and header to maintain the direction of spray essentially tangential to the filter cake as the depth of the filter cake is reduced by the knife during rotation of the drum.

The nozzles, mounted on a header, are positioned/-spaced away from the drum and along its outer surface prior to the location of contact between the outer surface of the filter cake and the knife. The nozzles are preferably positioned for spraying the displacing liquid in a direction opposite the direction of rotation of the drum. By spraying in such a direction the displacing liquid can be in contact with the filter cake for a time sufficient to provide for displacing $P_2O_5$ values entrapped in the filter cake.

The spray pattern 25 of the sprayers impinges the filter cake for covering the surface of the filter cake. Preferably, each sprayer provides a fan-shaped spray which extends to each adjacent spray pattern at the location of impingement on the filter cake. If the spray pattern did not meet, then a portion of the filter cake would not be contacted with the displacing liquid so as to displace $P_2O_5$ values in such portion. In addition, it is undesirable that there be any appreciable overlapping of the spray patterns. If there is substantial overlap between spray patterns, the displacing liquid in such areas of overlap can displace other displacing liquid into the cavity of the drum which can dilute the filtrate (phosphoric acid) recovered and is an inefficient utilization of the displacing liquid.

Dilution of the phosphoric acid is also a factor in determining the flow rate of displacing liquid through the header and nozzles. The acceptable dilution of the recovered phosphoric acid filtrate is the amount of dilution that can be commercially acceptable. That is, if too great a dilution results, then an expense is encountered to reconstitute the phosphoric acid by evaporating the diluent. If sufficient BTU's are available for economic evaporation of the diluent, then a greater dilution can be tolerated for the amount of $P_2O_5$ recovered from the filter cake. The value of the recoverable and recovered $P_2O_5$ is also a consideration. For phosphoric acid processes an acceptable dilution is about four percent, more preferred two percent, or less, dilution of the filtered liquid phosphoric acid product (e.g., a two percent dilution of a 50% $P_2O_5$ analysis acid would result in a 49% $P_2O_5$ analysis acid).

A method to calculate the amount of displacing liquid to spray on the filter cake is to determine the volume of filter cake removed by the knife in gallons per minute. This value is then adjusted to determine volume or percent that is liquid. The determined results provides a value for the displacement liquid that would theoretically displace 100% of the $P_2O_5$ in the filter cake. This value can be reduced or enlarged to provide the flow rate of displacement liquid for the desired recovery of $P_2O_5$ values. These numbers can vary with the drum rotation speed and adjustment of the knife. For a drum about 10 feet in diameter and about 12 feet long and a rotation speed of about one rotation per minute, it has been found that for a crude acid feed of about 30 to 60 gpm a preferred flow rate of displacing liquid is about 3 to about 6 gallons per minute to recover about 75% of the $P_2O_5$ in the voids of a diatomaceous earth filter cake when filtering a crude acid containing about 45 to 50% $P_2O_5$ at about 150° to about 170° F.

A second header with additional sprayer nozzles can be used in the vacuum rotary precoat filter herein. Such a second header and nozzles provides a second spray of displacing liquid which can displace additional $P_2O_5$ values in the filter cake that were not displaced by the first spray of displacing fluid.

Generally, the crude phosphoric acid is filtered at temperatures greater than ambient such as about 120° to about 170° F. ($\sim$50°–71° C.) more preferred about 130° F. to about 150° F. ($\sim$54°–66° C.). Temperatures greater than about 170° F. are undesirable when diatomaceous earth is the filter aid as fluorine compounds present in the crude phosphoric acid can attack the diatomaceous earth. Because of the temperature of the phosphoric acid and filter cake, it has been found herein that the displacing liquid should preferably be heated to a temperature substantially equivalent to the temperature of the filter cake. The temperature differential between the spray of displacement liquid and filter cake is preferably no greater than about 15° C. and, more preferably, is no greater than about 5° C. When the temperature of the displacement liquid and filter cake are essentially the same, there is little thermal shock to the filter cake. Thermal shock can arise if the temperature differential is greater than 15° C. Thermal shock can cause cracking of the filter cake and otherwise also be deleterious to the filtration process. The displacement liquid can be heated by a suitable temperature regulator 30, such as a steam sparger.

The following examples illustrate embodiments of the apparatus for recovery of phosphoric acid values from a crude phosphoric acid stream.

EXAMPLES 1–5

Five experiments were conducted using varying arrangements of spray nozzles having differing spray characteristics. The nozzles were placed on a header spaced from the drum of a Dorr-Oliver 10 ft. diameter ×12 ft. long precoat filter. A crude phosphoric acid stream at a temperature between about 130° to about 150° was filtered. A filter aid of diatomaceous earth was initially precoated on the drum to a depth of about four inches in each example.

In example 1, a single header was utilized having five 65° nozzles each having an orifice of 0.093 inch. The flow rate of the water (displacing liquid) was at a rate of about 5 gallons per minute gpm). The nozzles were standard nozzles.

In Example 2 a single header was provided having 2 Spraco 43072504 nozzles. The nozzles provide a spray pattern of 120° and an orifice of 0.118 inch. The nozzles provided an even flow of spray, i.e., an even distribution of the water throughout the spray pattern. The flow rate of the water was at a total of 4.8 gpm.

In Example 3, a double header having 2 Spraco 43072504 nozzles providing a spray pattern over 120° per header was used. The nozzles had an orifice of 0.118 inch. The total flow rate of water was 2.5 gpm.

In Example 4 a single header was provided having five Spraco 23181704 nozzles. The nozzles have an orifice of 0.076 inch and provide a spray pattern of 80° in a standard pattern. The total water flow rate was 2.5 gpm.

In Example 5 a single header was utilized having five Spraco 23181704 nozzles. Each of the nozzles has an orifice of 0.076 inch and provides a spray pattern of 80° and a standard flow pattern. The total water flow was at a rate of 5 gpm.

The results of the filtration tests conducted in each of the examples are given in the following table. With regard to Example 1 approximately ¾ of the $P_2O_5$ values present in the filter cake were recovered from the filter cake and included in the liquid phosphoric acid product. In the following table the feed stream of crude phosphoric acid is listed. The composition of the liquid product (phosphoric acid) is also listed as well as the analysis of the filter cake.

The table shows that $P_2O_5$ values can be recovered, and for examples 2, 4 and 5 averaged, with $P_2O_5$ values lost to the filter cake being reduced to an average of only about 2.5%. The tests also show that the example 2 nozzle is a preferred configuration.

Unless otherwise indicated herein, all percentages are by weight. As used herein, the term "substantially solids free" means that the filtrate contains less than about 1% solids (typically less than 0.5%).

In the above examples, a layer of the initially 4 inch thick filter cake is continuously removed by the doctor blade until the cake reaches about ½" in thickness, at which point the filtration of crude acid is stopped and a new layer of diatomaceous earth is applied.

In these examples no provision was made for adjusting the angle of the spray as the filter cake thickness changed. The angle chosen was such that a uniform spray without substantial overlap was obtained when the cake was about 2" thick. Therefore, at greater thickness there was a slight area between sprays where there was no overlapping of sprays and at thickness less than about 2" there was a slight overlapping. Better results than in these examples can be obtained by appropriate continuous adjustment of the spray angle and/or pattern.

In the above examples, the crude, concentrated, phosphoric acid had been treated with a calcium and fluoride containing solid in accordance with the teachings of U.S. Pat. No. 4,136,199 and 4,243,643, the entire disclosure of said patents being incorporated herein by reference. The present invention is especially useful for filtered hemihydrate process acid, especially after concentration by evaporation, which has been treated in acordance with the teachings of said patents.

TABLE

|  |  | Ex. 2 | Ex. 3 | Ex. 4 | Ex. 5 |
|---|---|---|---|---|---|
| Feed | Wt. % MgO | .57 | .55 | .57 | .65 |
|  | Wt. % $P_2O_5$ | 42.05 | 41.39 | 42.05 | 42.86 |
|  | Wt. % $Al_2O_3$ | 1.35 | 1.35 | 1.35 | 1.51 |
|  | Wt. % $Fe_2O_3$ | 1.0 | 1.02 | 1.0 | 1.07 |
|  | Wt. % Solids | 11.28 | 12.09 | 11.28 | 9.69 |
| Product Avg. | $P_2O_5$ | 43.76 | 44.87 | 45.26 | 44.06 |
|  | Wt. % MgO | .18 | .20 | .17 | .19 |
|  | Wt. % $Fe_2O_3$ | 1.08 | 1.09 | 1.13 | 1.09 |
|  | Wt. % $Al_2O_3$ | .92 | .94 | .93 | .95 |
|  | Wt. % Solids | .45 | .28 | .50 | .32 |
|  | *SpG | 1.508 | 1.530 | 1.526 | 1.558 |
| Cake Avg. | $P_2O_5$ | 6.82 | 12.65 | 8.10 | 7.92 |
|  | Wt. % MgO | 4.22 | 3.31 | 4.47 | 4.02 |
|  | Wt. % $Fe_2O_3$ | .18 | .44 | .28 | .30 |
|  | Wt. % $Al_2O_3$ | 6.84 | 4.41 | 5.56 | 5.13 |
|  | Wt. % Solids | 71.58 | 63.96 | 68.04 | 65.46 |
| Total Product (gal.) integrator |  | 5620 | 11,200 | 6,400 | 11,400 |
| Avg. Flow (gpm) integrator |  | 20.8 | 31.1 | 21.3 | 63 |
| Product $P_2O_5$ (tons) |  | 24.24 | 8.36 | 23.07 | 8.38 |
| Cake $P_2O_5$ (tons) |  | .1878 | 1.56 | .647 | .347 |
| Percent of Feed $P_2O_5$ to Cake |  | .77% | 15.7% | 2.73% | 3.98% |

*SpG = Specific Gravity.

What is claimed is:

1. In a rotary vacuum precoat filter apparatus for producing a filtered liquid from an incoming solids-containing slurry, the filter apparatus having a rotatable filter drum, a precoat of filter aid material forming a filter cake on an outer surface of the drum, and means for maintaining a differential pressure across the filter aid material to draw filtrate into the drum when the unfiltered slurry is applied to an outer surface of the filter cake, the improvement comprising:
    (a) nozzle means for spraying a displacing liquid on an outer surface of the filter cake, said nozzle means being positioned for directing the spray of displacing liquid essentially tangeantially to the filter cake along a direction opposite a rotational direction of the drum; and
    (b) supply means connected to the nozzle means for delivering the displacing liquid under pressure to the nozzle, the supply means including temperature-control means for regulating the temperature of the displacing liquid so that the temperature of the sprayed liquid impinging on the filter cake does not cause substantial thermal shock and fracture of the filter cake, said supply means being further operative for supplying the displacing liquid to the nozzle means in a quantity sufficient to enable secondary recovery of filtrate by displacing retained filtrate from the filter cake in to the drum.

2. An improved rotary vacuum precoat filter apparatus as recited in claim 1 wherein the nozzle means includes a plurality of nozzles positioned to spray a displacing liquid on the outer surface of the filter cake.

3. An improved rotary vacuum precoat filter apparatus as recited in claim 2 wherein each nozzle is configured for providing a fan-shaped spray pattern with the spray pattern of adjacent nozzles substantially in contact for forming contiguous spray patterns on the filter cake from one edge thereon to another edge thereon.

4. An improved rotary vacuum precoat filter as recited in claim 1 further comprising a knife means for removing an outer portion of the filter cake after the filter cake has been sprayed with the displacing liquid.

5. In a phosphoric acid recovery apparatus wherein a crude phosphoric acid containing solid impurities is filtered through a rotary vacuum precoat filter for producing a substantially solids-free phosphoric acid liquid filtrate, wherein the rotary vacuum precoat filter apparatus has a rotatable filter drum, a precoat of filter aid material forming a filter cake on an outer surface of the drum and means for maintaining a pressure differential across the filter aid material to draw substantially solids-free phosphoric acid liquid filtrate into the filter drum when the crude phosphoric acid is applied to an outer surface of the filter cake leaving remaining in the filter aid material such solid impurities and a portion of the phosphoric acid, the improvement comprising:

(a) nozzle means for spraying a displacing liquid on an outer surface of the filter cake, said nozzle means being positioned for directing the spray of displacing liquid essentially tangeantially to the filter cake along a direction opposite a rotational direction of the drum; and, (b) supply means connected to the nozzle means for delivering the displacing liquid under pressure to the nozzle means, the supply means including temperature-control means for regulating the temperature of the displacing liquid so that the temperature of the sprayed displacing liquid impinging on the filter cake does not cause substantial thermal shock and fracture of the filter cake and wherein such sprayed displacing liquid displaces retained phosphoric acid from the filter cake into the filter drum.

6. An improved phosphoric acid recovery apparatus as recited in claim 5 wherein the filter aid material is diatomaceous earth and the temperature-control means is operative for causing a temperature differential between the filter cake and displacing liquid to be less than about 15° C.

7. An improved phosphoric acid recovery apparatus as recited in claim 5 wherein the nozzle means includes a plurality of nozzles positioned to spray a displacing liquid on the outer surface of the filter cake.

8. An improved phosphoric acid recovery apparatus as recited in claim 7 wherein each nozzle is configured for providing a fan-shaped spray pattern with the spray pattern of adjacent nozzles substantially in contact for forming contiguous spray pattern on the filter cake.

9. An improved phosphoric acid recovery system as recited in claim 5 further comprising a knife means for removing an outer portion of the filter cake after the filter cake has been sprayed with the displacing liquid.

10. In a phosphoric acid recovery apparatus wherein a crude phosphoric acid containing solid impurities is filtered through a rotary vacuum precoat filter apparatus for producing a substantially solids-free phosphoric acid liquid filtrate, wherein the rotary vacuum precoat filter apparatus has a rotatable filter drum, a precoat of filter aid material forming a filter cake on an outer surface of the drum and means for maintaining a pressure differential across the filter aid material to draw substantially solids-free phosphoric acid liquid filtrate into the filter drum when the crude phosphoric acid is applied to an outer surface of the filter cake leaving solid impurities and a portion of the phosphoric acid in the filter aid material, the improvement comprising:

(a) nozzle means for spraying a displacing liquid on an outer surface of the filter cake, said nozzle means including a plurality of nozzles positioned to spray the displacing liquid essentially tangentially to the filter cake and configured for providing a fan-shaped spray pattern with the spray pattern of adjacent nozzles substantially in contact for forming contiguous spray patterns on the filter cake from one edge therein to another edge thereon, said nozzle means being positioned to direct the spray of displacing liquid along a direction opposite a rotational direction of the drum; and, (b) supply means connected to the nozzle means for delivering the displacing liquid under pressure to the nozzles, the supply means including temperature-control means for regulating the temperature of the displacing liquid so that the temperature of the sprayed displacing liquid impinging on the filter cake is within about 15° C. of the filter cake temperature for minimizing thermal shock and fracture of the filter cake and wherein such sprayed displacing liquid displaced retained phosphoric acid from the filter cake into the filter drum.

* * * * *